Oct. 6, 1970 HIROSHI NOZAKI ET AL 3,532,544
METHOD OF MANUFACTURE OF A NEGATIVE ELECTRODE
FOR A STORAGE BATTERY
Filed July 10, 1968
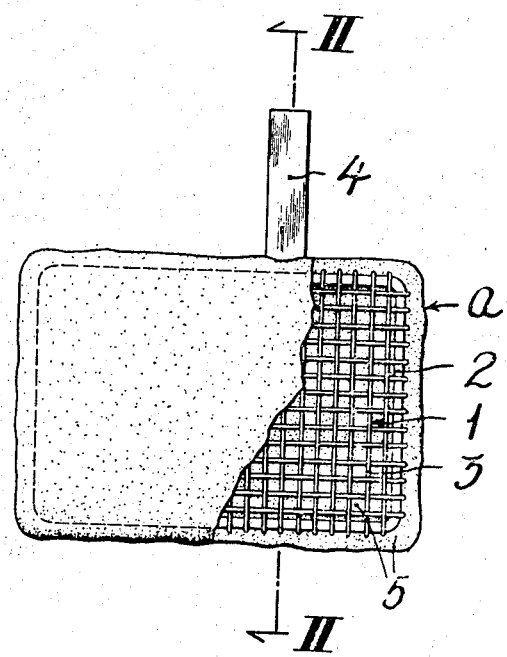
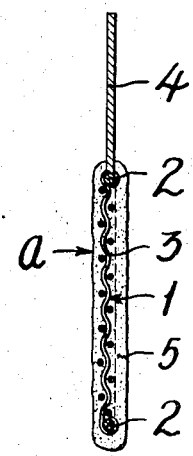
INVENTOR
BY Hiroshi Nozaki
Shigeyuki Yasuda
ATTORNEY United States Patent Office 3,532,544
Patented Oct. 6, 1970

3,532,544
METHOD OF MANUFACTURE OF A NEGATIVE ELECTRODE FOR A STORAGE BATTERY
Hiroshi Nozaki and Shigeyuki Yasuda, Tokyo, Japan, assignors to Kabushiki Kaisha Noza Kagaku, Tokyo, Japan
Filed July 10, 1968, Ser. No. 743,722
Claims priority, application Japan, July 10, 1967, 42/44,028
Int. Cl. H01m 39/00
U.S. Cl. 136—27      4 Claims

ABSTRACT OF THE DISCLOSURE

A method is provided for obtaining a negative electrode comprising a grid of stainless steel, impregnated with and covered by a spongy lead active substance of a given thickness. The spongy lead is formed by applying a paste of lead oxides and sulphates to the stainless steel grid and subjecting the coated grid to current flow in an electrolytic medium, containing nicotinic acid amide, with a positive terminal to reduce the paste.

BRIEF SUMMARY OF THE INVENTION

The invention relates to novel negative electrode plates of storage batteries, and particularly those having a core which is constituted as a grid or perforate structure.

A conventional grid of lead-antimony alloy has disadvantages as an electrode plate of a battery in that the same is limited in the formation of pleats due to its cast molding, and it is comparatively heavy due to the considerable density of lead, while it is comparatively poor in toughness. Additionally, such a grid has the disadvantage that an electrode plate obtained therefrom is high in price because of the relative scarcity and cost of lead. In view of these disadvantages, an electrode plate is desired which can be obtained, without using lead, and which is economically feasible and free from corrosion by an electrolyte containing sulfuric acid.

An object of the present invention is to provide an electrode which satisfies the above requirements. According to the invention there is provided an electrode plate for a storage battery comprising a grid made from stainless steel, and a paste prepared from an active material such as lead oxides, lead sulfate or the like kneaded with a liquid such as sulfuric acid or the like and applied to the grid to fill the interior thereof and cover both its surfaces, the applied paste then being reduced by a formation process to form a spongy layer on the surfaces of the grid.

At present, it is well known that stainless steel is easily corroded by sulfuric acid, and it is of course senseless to use the same as an electrode plate for a lead-acid storage battery and to the best of our knowledge no attempts have ever been made for its use.

We have found, however, as a result of various experiments, that stainless steel when constituted as a grid in a paste type negative electrode, can be favorably used, without being corroded by sulfuric acid, as a negative electrode of a lead-acid storage battery using an electrolyte of a conventional sulfuric acid content of about 36%, or a lead storage battery using a neutral electrolyte containing sulfuric acid in a concentration lower than 10%. Thus there can be realized a new type electrode plate.

In this invention, a grid body of stainless steel is formed in various desired shapes. For example, a conventional 18–8 stainless steel plate can be punched to form a predetermined plate-type grid having a large number of paste filling perforations. Alternatively, ordinary stainless steel wire or piano wire or the like, can be formed into a grid of wire netting. A separate paste can be prepared, for example, with an active material obtained by mixing litherge and red lead at the rate of 100 parts $PbO_2$ and 50 parts $PbO$ and kneaded with sulfuric acid, or an aqueous solution of neutral sulfate or the like. The paste is applied to the grid to fill the interior thereof and to coat both its surfaces to a predetermined thickness, and then the paste is dried. Thereafter, the assembly is immersed in a liquid such as dilute sulfuric acid, neutral electrolyte, or the like and subjected to a formation treatment using the assembly as a negative pole and an ordinary antimony-lead alloy grid as a positive pole at a current of 0.5 to 1.0 ampere per $dm.^2$. By this formation, the paste adhered to the grid body becomes a spongy lead having a large number of pores of atomic or molecular size because the oxygen contained therein escapes therefrom. Thus, there is obtained a negative electrode having spongy lead closely adherent to the interior of the grid and both surfaces thereof at a suitable thickness.

If, for example, a liquid prepared by adding a small amount of nicotinic acid amide to an aqueous solution of $Mg_2SO_4 \cdot 7H_2O$ is used as the formation liquid, the current efficiency during the formation process can be improved and an electrode plate having excellent adhesion of its active material can be obtained.

BRIEF DESCRIPTION OF THE DRAWING

FIG. 1 is a front view, partly broken away, of one embodiment of the invention, and FIG. 2 is a sectional view taken along the line II—II in FIG. 1.

DETAILED DESCRIPTION

In the drawing there is shown a negative electrode $a$ having a grid 1 constituted of a stainless steel wire netting forming an electrode plate grid. The grid 1 comprises a stainless steel frame 2 to which a stainless steel wire net 3 is attached. A stainless teel lug 4 is welded integrally to the wire net 3. A spongy lead substance 5, constituting the active material, is tightly adherent to the interior and both surfaces of the net.

With a grid constituted as a wire net, the paste filling openings can become extremely large and the resultant battery capacity can be about 2 times greater than that of a conventional lead-antimony electrode plate. Additionally, the total weight of the grid body can become extremely small and there can be obtained an electrode plate of outstanding efficiency.

It has become clear from many of our experiments that a stainless steel electrode plate thus obtained can be favorably used, without any corrosion of the stainless steel grid, as a negative electrode not only for a lead storage battery using a neutral sulfate electrolyte but also for an ordinary lead-acid storage battery including sulfuric acid and also a lead storage battery using a neutral electrolyte containing sulfuric acid in a concentration lower than 10%.

The reason why the stainless steel is not corroded can be explained as follows:

During the discharging operation, a stainless steel negative electrode is such that its grid itself is in a negative pole condition, so that the stainless steel can not be dissolved in sulfuric acid. During the charging operation, the grid body is covered by the adhered lead on its surface so as to be isolated from contact with the electrolyte, while the lead on the surface of the grid has an extremely large contact area with the electrolyte because of its spongy constitution, and additionally the iron content of the stainless steel is equal to or lower in standard potential than lead, whereby the iron of the grid body cannot be dissolved in sulfuric acid.

During idle operation, the lead serves as a corrosion-protector for the grid body and the grid body becomes a negative pole, so that it is not dissolved in sulfuric acid. The stainless steel, therefore, which constitutes the grid of the negative plate, is not subject to corrosion during charging, discharging or idle operation.

Thus, according to this invention, a grid, made of stainless steel, and a spongy lead adhered to the surface thereof form a negative electrode, so that the electrode can be used in lieu of the lead-antimony negative electrode in the conventional lead-acid storage battery. This permits the production of a strong, light weight and economical battery. If, additionally, the grid is formed of a wire net, the amount of filling paste may be increased and the battery capacity improved.

An embodying example of this invention will now be explained in detail as follows:

A wire net grid of 20 mm. in width and 25 mm. in height is prepared from 18–8 stainless steel wire of 1 mm. in diameter. A paste for a negative pole having the composition mentioned below is applied to the grid to fill the interior thereof and to cover both its surfaces to form on each surface a coated layer of 5 mm. in thickness when dried.

Paste composition: $PbO_2$—15%; $PbO$—60%; and $PbSO_4$—25%.

The grid with the paste thereon is then subjected to a current flow of 10 ampere-hours by being constituted as a negative electrode and by using a formation liquid of magnesium sulfate of 250 gr./l. and nicotinic acid amide of 3 g./l., whereby there is obtained a negative electrode.

This negative electrode and a lead-antimony alloy positive electrode filled with a paste composed of 70% $PbO$, 8% $PbO_2$, and 22% $PbSO_4$ and then subjected to a formation are combined to form a lead-acid storage battery, and a current discharge at a constant 0.2 ampere is effected. Thus, there is obtained a storage battery of 3.2 ampere-hours capacity. This battery has been repeatedly used, but there has not been detected any corrosion of the grid by sulfuric acid.

What is claimed is:

1. A method of making a negative electrode of a lead acid storage battery, said method comprising coating a stainless steel grid with a paste containing active lead substances selected from the group consisting of lead oxides and lead sulfate, drying the paste, and subjecting the grid, when the paste has dried, to an electrolytic formation treatment using an aqueous electrolytic medium consisting of magnesium sulfate and containing an effective amount of nicotinic acid amide to obtain the negative electrode, said electrolytic formation treatment converting said active lead substances to lead.

2. A method as claimed in claim 1 wherein said electrolytic treatment comprises applying current to the grid, with the paste thereon, in said electrolytic medium with a positive electrode whereby a storage battery is formed.

3. A method as claimed in claim 2 wherein said paste is composed of 15% $PbO_2$, 60% $PbO$ and 25% $PbSO_4$.

4. A method as claimed in claim 3 wherein said paste is obtained by mixing 100 parts $PbO_2$ and 50 parts $PbO$ with sulfuric acid or an aqueous solution of neutral sulfate.

References Cited

UNITED STATES PATENTS

| | | | |
|---|---|---|---|
| 2,903,497 | 9/1959 | Comanor | 136—26 |
| 3,082,284 | 3/1963 | Mount | 136—120 |
| 3,173,810 | 3/1965 | Voss et al. | 136—26 |
| 3,198,665 | 8/1965 | Howell | 136—26 |

FOREIGN PATENTS

| | | |
|---|---|---|
| 515,764 | 8/1955 | Canada. |
| 6,707,855 | 12/1967 | Netherlands. |

WINSTON A. DOUGLAS, Primary Examiner

C. F. LEFEVOUR, Assistant Examiner

U.S. Cl. X.R.

136—76